United States Patent [19]

LoCascio

[11] Patent Number: 5,956,241
[45] Date of Patent: Sep. 21, 1999

[54] BATTERY CELL EQUALIZATION CIRCUIT

[75] Inventor: James J. LoCascio, San Jose, Calif.

[73] Assignee: Micro Linear Corporation, San Jose, Calif.

[21] Appl. No.: 08/773,098

[22] Filed: Dec. 24, 1996

Related U.S. Application Data

[60] Provisional application No. 60/012,238, Feb. 26, 1996.

[51] Int. Cl.$^6$ .................................................. H02M 3/335
[52] U.S. Cl. ............................................. 363/21; 363/131
[58] Field of Search .................................. 363/15, 16, 20, 363/210, 43, 131

[56] References Cited

U.S. PATENT DOCUMENTS

| | | | |
|---|---|---|---|
| 3,539,902 | 11/1970 | Hickling | 363/43 |
| 3,832,643 | 8/1974 | Van Heyningen et al. | 363/43 |
| 4,628,438 | 12/1986 | Montague | 363/43 |
| 4,685,043 | 8/1987 | Mehnert | 363/43 |
| 4,695,935 | 9/1987 | Oen et al. | 363/21 |
| 4,886,952 | 12/1989 | Horiuchi | 323/255 |

*Primary Examiner*—Jeffrey Sterrett
*Attorney, Agent, or Firm*—Haverstock & Owens LLP

[57] ABSTRACT

A battery power conversion circuit comprising a cell equalization circuit that ensures that each cell in a multiple battery cell stack is depleted of charge at an equal rate. The stack is coupled to provide current to a primary winding of a transformer. Each of the nodes between cells is coupled to the primary winding of the transformer through a transistor such that an equal number of turns of the primary winding are present between each node. An additional transistor coupled in series with the primary winding controls the current through the primary winding such that a capacitor coupled to a secondary winding of the transformer may be charged by an induced secondary current to a desired voltage level for powering a load. A controller circuit monitors the output voltage level and controls the transistor in series with the primary winding for maintaining the desired load voltage through a feedback loop. When the transistor in series with the primary winding is turned on to allow current to flow through the primary winding, each of the transistors coupled to each of the nodes between battery cells is also turned on by the controller. Only a small current travels through each of the transistors coupled to each of the nodes. Therefore, the voltage across each battery cell is equalized due to the equal number of transformer windings that are present between each of the nodes. This prevents any of the battery cells from being discharged to a voltage level that is lower than any other cell. Because each cell is maintained at a voltage level that is the same as each other cell, the entire battery stack may be discharged to a maximum degree without any one cell becoming depleted first or damaged. Other variations are also disclosed. For example, a single node may serve two battery cells. This results in looser regulation of the voltage to which each cell is discharged, but also results in a simpler and less expensive circuit. Also, the present invention may be used with battery cell stacks having any number of battery cells.

20 Claims, 3 Drawing Sheets

BATTERY CELL EQUALIZATION CIRCUIT

This application claims the benefit of U.S. Provisional Application No. 60/012,238 filed Feb. 26, 1996.

FIELD OF THE INVENTION

The present invention relates to the field of battery power conversion circuits. More particularly, the present invention relates to the field of battery power conversion circuits having an ability to equally discharge each battery cell in a multiple battery cell stack.

BACKGROUND OF THE INVENTION

A battery cell generates a maximum voltage across its terminals when the battery cell is fully charged. During use, in which power is drawn from the battery, the battery voltage drops gradually until the battery cell reaches a point in its discharge cycle wherein the battery voltage begins to drop off more rapidly and the cell becomes depleted. Under equal load conditions, the rate at which a battery cell loses its charge varies depending upon the materials from which the battery cell is constructed and also may vary from one battery cell to another battery cell of the same type.

The voltage level to which a battery cell of a given type may be charged also depends upon the materials from which the battery cell is constructed. For example, a NiCad battery cell can be charged to approximately 1.2 volts. Because the voltage (and current) that may be developed by a single battery cell is limited, many battery powered devices that require more power than a single battery cell can provide utilize a stack of battery cells as a power source. A battery cell stack is constructed by stacking a number of battery cells in series and obtaining power from the stack by connecting a terminal to each of the outermost terminals of the battery cells at each end of the stack. For example, if a given device requires a voltage level of approximately 6.0 volts to operate, a battery stack comprising five NiCad batteries (in series), which will generate approximately 6.0 volts, may be used to power the device. Alternatively, a battery stack comprising some other number of cells may be regulated to the required voltage level by a power converter circuit.

If one of the battery cells in the stack is depleted of charge to a certain degree before other cells in the stack, the depleted cell may become damaged by a reversed polarity voltage imposed upon the depleted cell which is caused by the current which travels through all of the cells of the stack. This resulting damage may affect the ability of the damaged cell to be recharged effectively at a later time. This, in turn, may exacerbate the problem by causing the damaged cell to again become depleted earlier than other cells of the stack in a subsequent discharge cycle.

One solution to this problem is to avoid depleting the entire battery cell stack to a point where a single cell may become subjected to the above-described damage. This solution, however, has drawbacks. One drawback is that it is not possible to predict precisely when this point will be reached, having the result that a significant amount of usable battery power may be remaining in the stack when the stack is recharged. Therefore, the battery stack will have to be recharged more often which is, at least, inconvenient. Another drawback is that some types of rechargeable batteries suffer from a problem known as "memory" wherein a battery cell that is not fully discharged will not be able to become recharged to a capacity that is as great as if the cell had been fully discharged before charging. Therefore, the total charge capacity of the stack may also be diminished.

What is needed, therefore, is a battery power conversion circuit that overcomes the above-mentioned drawbacks.

SUMMARY OF THE INVENTION

The invention is a battery power conversion circuit comprising a cell equalization circuit that ensures that each cell in a multiple battery cell stack is depleted of charge at an equal rate. The stack is coupled to provide current to a primary winding of a transformer. Each of the nodes between cells is coupled to the primary winding of the transformer through a transistor such that an equal number of turns of the primary winding are present between each node. An additional transistor coupled in series with the primary winding controls the current through the primary winding such that a capacitor coupled to a secondary winding of the transformer may be charged by an induced secondary current to a desired voltage level for powering a load. A controller circuit monitors the output voltage level and controls the transistor in series with the primary winding for maintaining the desired load voltage through a feedback loop.

When the transistor in series with the primary winding is turned on to allow current to flow through the primary winding, each of the transistors coupled to each of the nodes between battery cells is also turned on by the controller. A small current travels through each of the transistors coupled to each of the nodes. Therefore, the voltage across each battery cell is equalized due to the equal number of transformer windings that are present between each of the nodes. This prevents any of the battery cells from being discharged to a voltage level that is lower than any other cell. Because each cell is maintained at a voltage level that is the same as each other cell, the entire battery stack may be discharged to a maximum degree without any one cell becoming depleted first or damaged.

Other variations are also disclosed. For example, a single node may serve two battery cells. This results in looser regulation of the voltage to which each cell is discharged, but also results in a simpler and less expensive circuit. Also, the present invention may be used with battery cell stacks having any number of battery cells.

DETAILED DESCRIPTION OF THE PREFERRED EMBODIMENT

Figure 1:
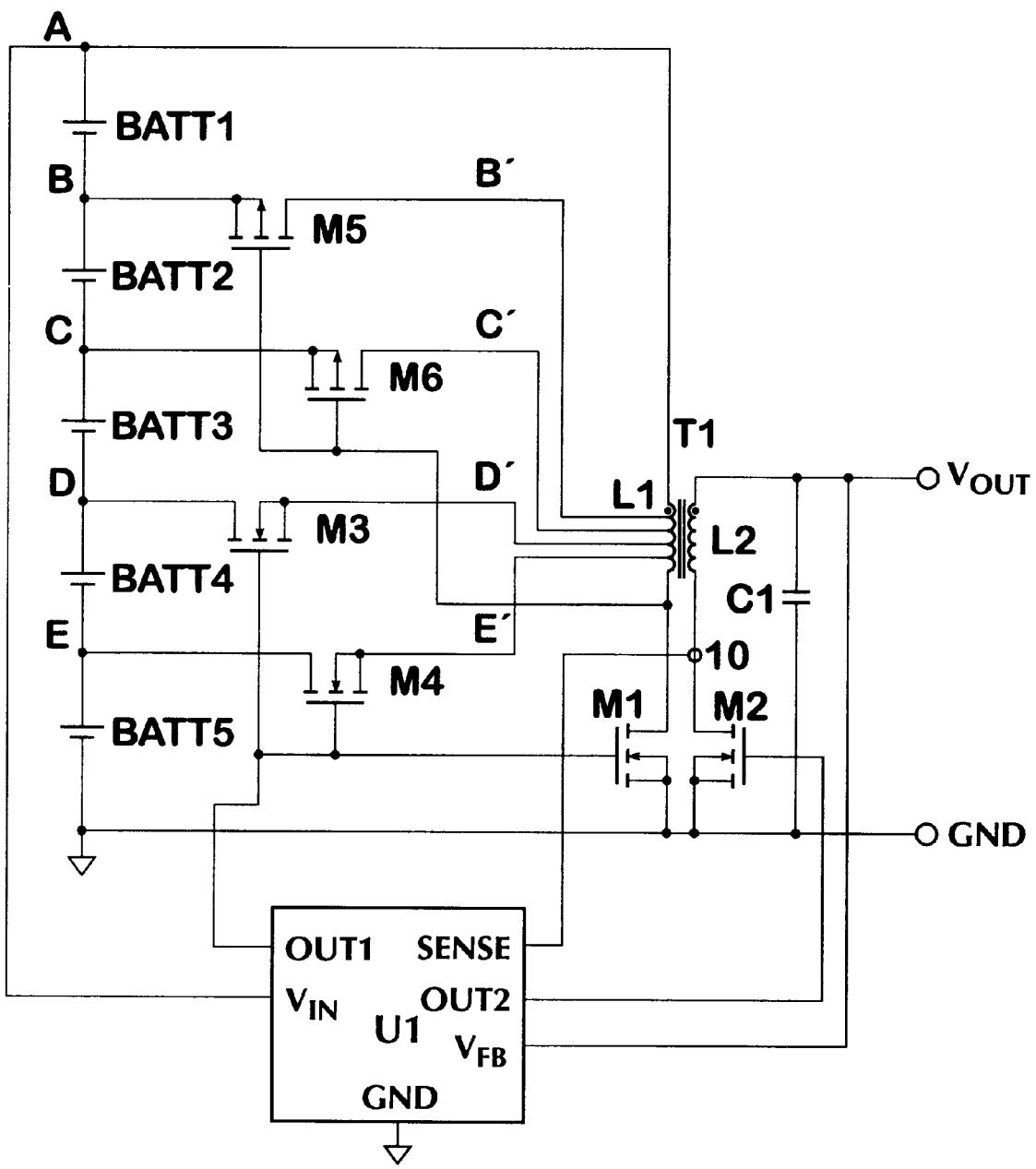
FIG. 1 illustrates a schematic diagram of the preferred embodiment of the present invention having a five battery cell stack.

Referring to FIG. 1, a schematic diagram of the preferred embodiment of the present invention having a five battery cell stack is shown. A positive terminal of a first battery cell BATT1 is coupled to a node A. A negative terminal of the first battery cell BATT1 is coupled to a node B. A positive terminal of a second battery cell BATT2 is coupled to the node B. A negative terminal of the battery cell BATT2 is coupled to a node C. A positive terminal of a third battery cell BATT3 is coupled to the node C. A negative terminal of the battery cell BATT3 is coupled to a node D. A positive terminal of a fourth battery cell BATT4 is coupled to the node D. A negative terminal of the battery cell BATT4 is coupled to a node E. A positive terminal of a fifth battery cell BATT5 is coupled to the node E. A negative terminal of the battery cell BATT5 is coupled to a ground node.

A drain of a PMOSFET M5 is coupled to the node B. A source of the PMOSFET M5 is coupled to a node B'. A drain of a PMOSFET M6 is coupled to the node C. A source of the PMOSFET M6 is coupled to a node C'. A drain of an NMOSFET M3 is coupled to the node D. A source of the NMOSFET M3 is coupled to a node D'. A drain of an NMOSFET M4 is coupled to the node E. A source of the NMOSFET M4 is coupled to a node E'.

A transformer T1 has a primary winding L1 and a secondary winding L2. The primary winding L2 has a first end terminal, a first tap, a second tap, a third tap, a fourth tap and a second end terminal. An equal number of turns of the primary winding L1 are present between the first end terminal and the first tap; between the first tap and a the second tap; between the second tap and the third tap; between the third tap and the fourth tap; and between the fourth tap and the second end terminal. The first end terminal of the primary winding L1 is coupled to the node A. The first tap is coupled to the node B'. The second tap is coupled to the node C'. The third tap is coupled to the node D'. The fourth tap is coupled to the node E'. The second end terminal of the primary winding L1 is coupled to a drain of an NMOSFET M1. A source of the NMOSFET M1 is coupled to the ground node.

The secondary winding L2 of the transformer T1 has a first terminal and a second terminal. The first terminal of the secondary winding L2 is coupled to a first terminal of a capacitor C1 and to an output voltage terminal VOUT. The second terminal of the secondary winding L2 is coupled to a drain of an NMOSFET M2. A second terminal of the capacitor C1 is coupled to the ground node. A source of the NMOSFET M2 is coupled to the ground node.

Figure 3:
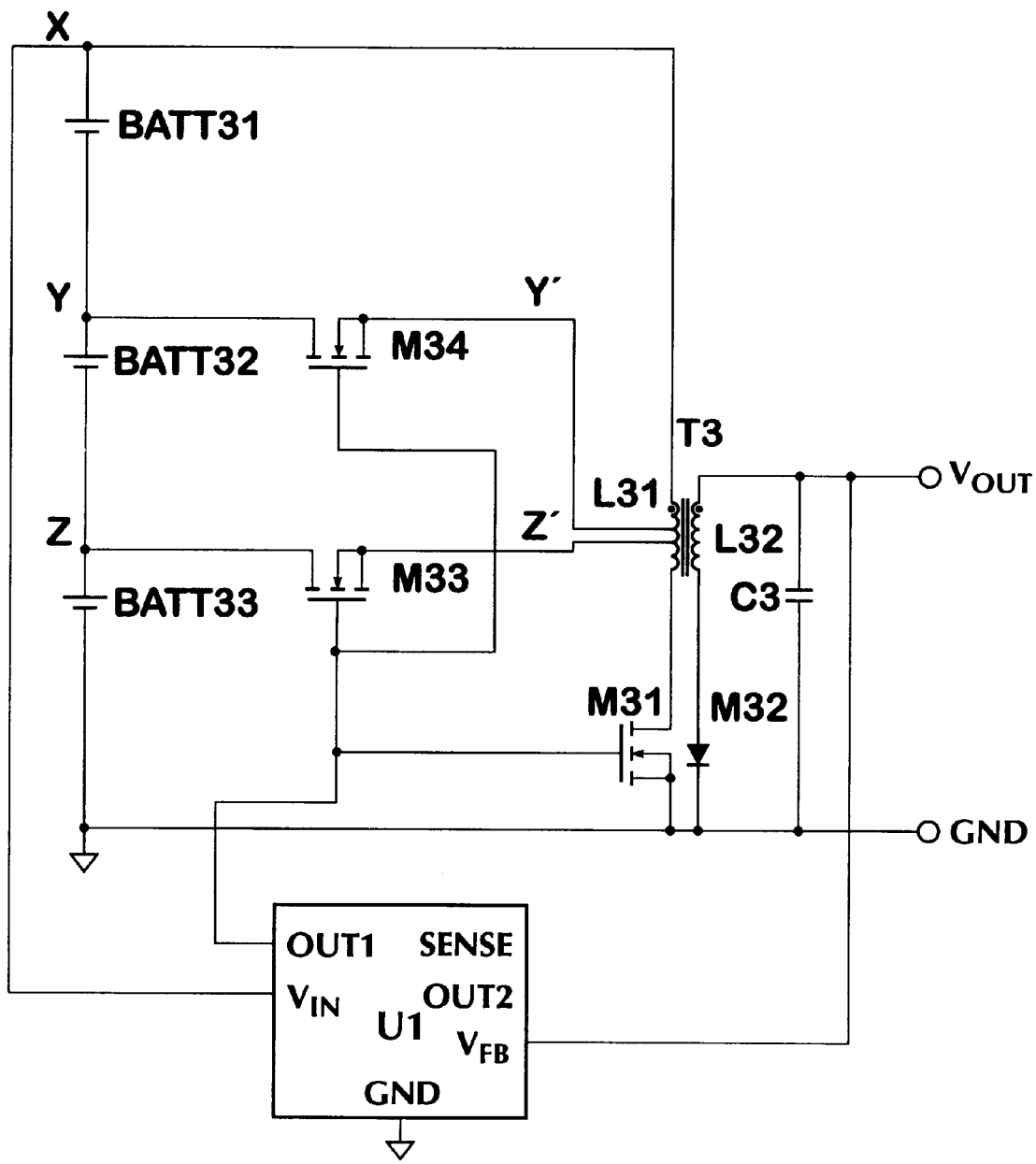
FIG. 3 illustrates a schematic diagram of a second alternate embodiment of the present invention having a three battery cell stack.

A controller circuit U1 is preferably an integrated circuit chip converter controller, part number ML4863, which is available from Micro Linear Corporation, located at 2092 Concourse Drive in San Jose, Calif., zip code 95131, but could be any flyback or boost type converter controller. A voltage input VIN to the controller U1 is coupled to the node A to supply power to the internal circuits of the controller U1. A ground terminal GND of the controller U1 is coupled to the ground node. A first control output terminal OUT1 of the controller U1 is coupled to a gate of the NMOSFET M1 to control a current through the primary winding L1. A second control output OUT2 of the controller U1 is coupled to a gate of the NMOSFET M2 for synchronously rectifying a current through the secondary winding L2 of the transformer T1. A feedback terminal VFB of the controller U1 is coupled to the output voltage node VOUT for monitoring and maintaining the output voltage of the circuit at a desired level. In the preferred embodiment, the controller also monitors the current through the secondary winding L2 by means for controlling a synchronous rectification function of M2. Therefore, a SENSE terminal of the controller U1 is coupled to a current sensing transducer 10. The current sensing transducer 10 is coupled anyplace that is in series with the winding L2 and may be any known current sensing device such as a resistor or an inductive pick-up. Alternately, the NMOSFET M2 could be replaced with a diode having an anode coupled to the second terminal of the secondary winding L2 and a cathode coupled to the ground node whereby the current through the secondary winding L2 would not be sensed or synchronously rectified and the control output terminal OUT2 would not be needed as shown in FIG. 3.

The first control output terminal OUT1 of the controller U1 is also coupled to a gate of the NMOSFET M3 and coupled to a gate of the NMOSFET M4. The drain of the NMOSFET M1 is coupled to a gate of the PMOSFET M5 and coupled to a gate of the PMOSFET M6.

A battery stack comprises the battery cells BATT1, BATT2, BATT3, BATT4 and BATT5. The invention ensures that each of the battery cells BATT1, BATT2, BATT3, BATT4 and BATT5 is depleted of charge at a rate that is equal to each of the other cells. Though the preferred embodiment includes five battery cells, it will be apparent to one of ordinary skill in the art that the invention could be practiced using a different number of cells.

The stack is coupled to provide current to the primary winding of the transformer T1. The primary winding L1 of the transformer T1 has an equal number of turns between node A and node B'; between node B' and node C'; between node C' and node D'; between node D' and node E' and between node E' and the node comprising the drain of the transistor M1.

The controller U1 monitors the output voltage of the converter VOUT across the output capacitor C1 through a feedback signal path comprising the terminal VFB. The controller U1 controls the transistor M1 which is coupled in series with the primary winding through a signal path that comprises the terminal OUT1. When the controller senses that the output voltage at VOUT is less than a desired value, the transistor M1 is controlled such that a current through the primary winding L1 charges the transformer T1 for inducing a current to flow in the secondary winding L2. The current through the secondary winding charges the capacitor C1. The transistor M2 is turned off during the periods during which L2 is charged and is turned on during periods in which L2 is discharged whereby the current through the secondary winding is synchronously rectified.

It will be apparent that the transistor M2 could be replaced with a diode having its anode coupled to the second terminal of the secondary winding L2 and its cathode coupled to the ground node or the diode could be otherwise placed in series with L2. The diode would then be utilized as a rectifying element in the discharge path to of the inductor L2 to block conduction during the charge period and to conduct during the discharge period.

When the transistor M1 is turned on to allow current to flow through the primary winding, each of the transistors M3, M4, M5 and M6 which are coupled to each of the nodes between battery cells is also turned on. The controller U1 turns on the transistors M1, M4 and M3 through the signal path comprising the terminal OUT1. When M1 is turned on, the drain of M1 drops to a low voltage level which causes M5 and M6 to turn on since M5 and M6 are PMOS devices.

When the transistor M1 is on, the voltage of the entire stack is applied across the primary winding L1 except for a small drop across the transistor M1. The voltage across L1 is evenly divided across the nodes A, B', C', D', E' and the node comprising the drain of the transistor M1 due to the fact that there are an equal number of turns of the primary winding L1 between each of these nodes. For example, if each of the battery cells BATT1, BATT2, BATT3, BATT4, BATT5 and BATT6 is a fully-charged NiCad battery cell, the voltage at node A will be approximately 6.0 volts since each cell produces about 1.2 volts. Therefore, when M1 is on, the voltage at node B' will be approximately 4.8 volts; the voltage at node C' will be approximately 3.6 volts; the voltage at node D' will be approximately 2.4 volts; the voltage at node E' will be approximately 1.2 volts; and the voltage at the node comprising the drain of the transistor M1 will be nearly zero volts.

Recall that when the transistor M1 is on, the transistors M3, M4, M5 and M6 are also on. Therefore, making an allowance for the drain to source voltage drop across each, the voltage at node B' will be applied to the node B; the voltage at node C' will be applied to node C; the voltage at node D' will be applied to node D; and the voltage at node E' will be applied to node E.

Only a small current will travel through each of the transistors M3, M4, M5 and M6 because the voltage across each of the transistors will generally be maintained at a low level. Therefore, each battery cell will have an equal voltage applied across its terminals in periods during which a current flows through the primary winding L1 which will prevent any one of the battery cells from being discharged to a voltage level that is lower than any other cell. Because each cell is maintained at a voltage level that is the same as each other cell, the entire battery stack may be discharged to a maximum degree without any one cell becoming damaged by having a reverse polarity voltage imposed across it.

Other variations are also disclosed below. For example, a single node may serve two battery cells as shown and described with reference to FIG. 2. This results in looser regulation of the voltage to which each cell is discharged, but also results in a simpler and less expensive circuit. Also, the present invention may be used with battery cell stacks having any number of battery cells as is exemplified by FIG. 3 which shows and describes the invention having three battery cells. From the descriptions herein, it will be apparent that one may modify the invention to implement many variations and yet still remain within the scope of the appended claims.

Figure 2:
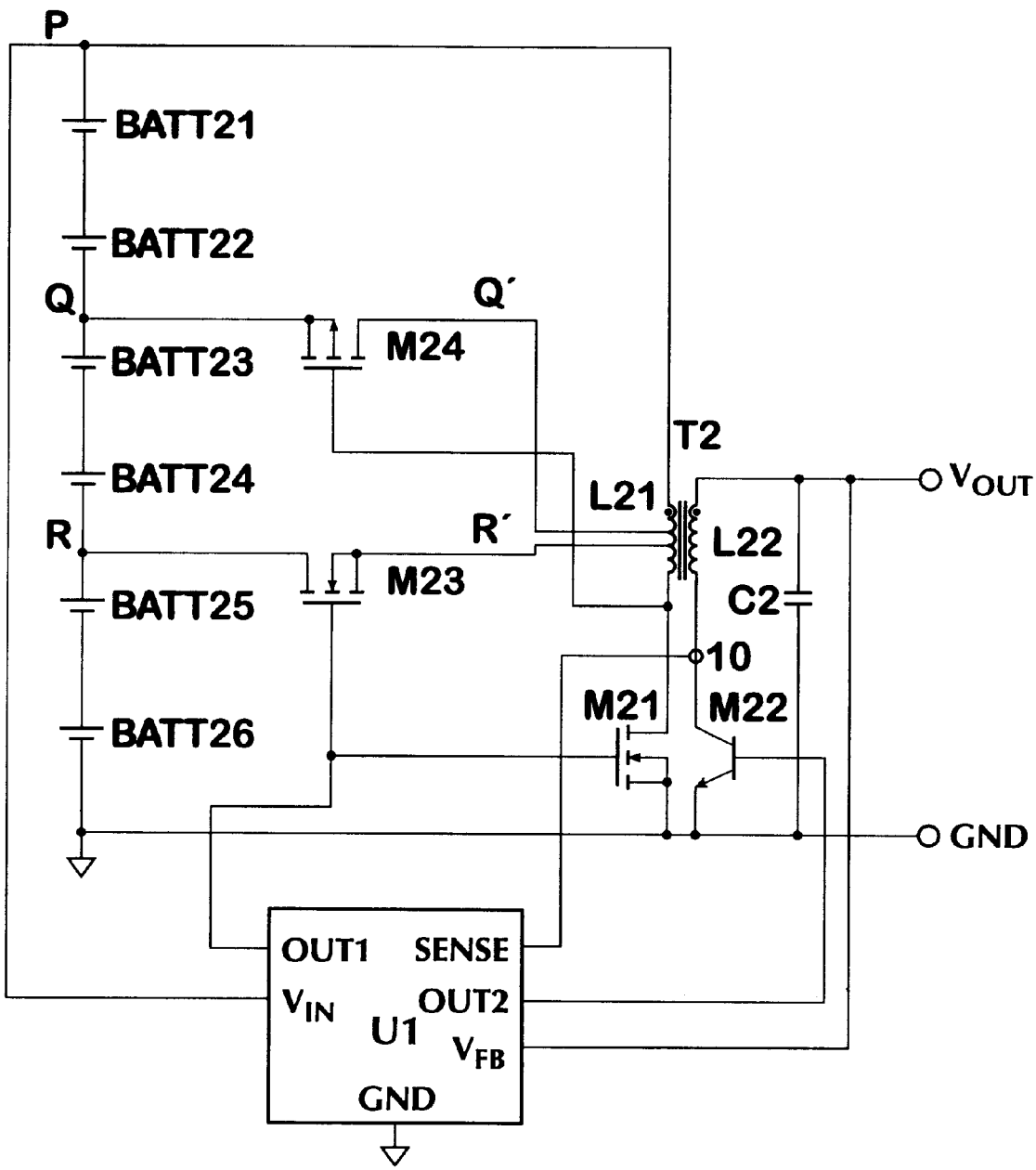
FIG. 2 illustrates a schematic diagram of a first alternate embodiment of the present invention having two battery cells coupled between each primary winding tap.

FIG. 2 illustrates a schematic diagram of a first alternate embodiment of the present invention having multiple battery cells coupled between primary winding taps. A positive terminal of a first battery cell BATT21 is coupled to a node P. A negative terminal of the battery cell BATT21 is coupled to a positive terminal of a second battery cell BATT22. A negative terminal of the battery cell BATT22 is coupled to a node Q. A positive terminal of a third battery cell BATT23 is coupled to the node Q. A negative terminal of the battery cell BATT23 is coupled to a positive terminal of a fourth battery cell BATT24. A negative terminal of the battery cell BATT24 is coupled to a node R. A positive terminal of a fifth battery cell BATT25 is coupled to the node R. A negative terminal of the battery cell BATT25 is coupled to a positive terminal of a sixth battery cell BATT26. A negative terminal of the battery cell BATT26 is coupled to the ground node.

A drain of a PMOSFET M24 is coupled to the node Q. A source of the PMOSFET M24 is coupled to a node Q'. A drain of an NMOSFET M23 is coupled to the node R. A source of the NMOSFET M23 is coupled to a node R'.

A transformer T2 has a primary winding L21 and a secondary winding L22. The primary winding L21 has a first end terminal, a first tap, a second tap and a second end terminal. An equal number of turns of the primary winding L21 exists between the first end terminal and the first tap; between the first tap and the second tap; and between the second tap and the second end terminal. The first end terminal of the primary winding L21 is coupled to the node P. The first tap is coupled to the node Q'. The second tap is coupled to the node R'. The second end terminal of the primary winding L21 is coupled to a drain of an NMOSFET M21. A source of the NMOSFET M21 is coupled to the ground node.

The secondary winding L22 of the transformer T2 has a first terminal and a second terminal. The first terminal of the secondary winding L22 is coupled to a first terminal of a capacitor C2 and to an output voltage node VOUT. The second terminal of the secondary winding L22 is coupled to a collector of a bipolar transistor M22. A second terminal of the capacitor C2 is coupled to the ground node. An emitter of the bipolar transistor M22 is coupled to the ground node.

A controller circuit U1 in FIG. 2 is the same as the controller circuit U1 shown and described with reference to FIG. 1. A voltage input VIN to the controller U1 is coupled to the node P to supply power to the internal circuits of the controller U1. A ground terminal GND of the controller U1 is coupled to the ground node. A first control output terminal OUT1 of the controller U1 is coupled to a gate of the NMOSFET M21 to control a current through the primary winding L21. A second control output terminal OUT2 of the controller U1 is coupled to a base of the bipolar transistor M22 for synchronously rectifying a current through the secondary winding L22. A feedback terminal VFB of the controller U1 is coupled to the output voltage node VOUT for maintaining the output voltage of the circuit at the desired level. A SENSE terminal of the controller U1 is coupled to a current sensing transducer 10. The current sensing transducer is coupled in series with the winding L22. As in FIG. 1, the controller U1 monitors the current through the secondary winding L22 for synchronous rectification, but alternately, M22 could be replaced with a diode as explained above and as shown in FIG. 3.

The first control output terminal OUT1 of the controller U1 is also coupled to a gate of the NMOSFET M23. The drain of the NMOSFET M21 is coupled to a gate of the PMOSFET M24.

The circuit shown in FIG. 2 operates in much the same way as the circuit shown in FIG. 1. The circuit shown in FIG. 2 differs from the circuit shown in FIG. 1 in that in FIG. 2 only every other node between battery cells is coupled to a tap of the primary winding L21. Therefore, when the transistors M21, M23 and M24 are turned on and the primary winding L21 is energized, the voltage across each pair of battery cells (BATT21 and BATT22; BATT23 and BATT24; BATT25 and BATT26) is equalized. This results in looser regulation of the voltage to which each individual cell is discharged, but also results in a simpler and less expensive circuit.

FIG. 3 illustrates a schematic diagram of a second alternate embodiment of the present invention having a three battery cell stack. A positive terminal of a first battery cell BATT31 is coupled to a node X. A negative terminal of the battery cell BATT31 is coupled to a node Y. A positive terminal of a second battery cell BATT32 is coupled to the node Y. A negative terminal of the battery cell BATT32 is coupled to a node Z. A positive terminal of a third battery cell BATT33 is coupled to the node Z. A negative terminal of the battery cell BATT33 is coupled to the ground node.

A drain of an NMOSFET M34 is coupled to the node Y. A source of the NMOSFET M34 is coupled to a node Y'. A drain of an NMOSFET M33 is coupled to the node Z. A source of the NMOSFET M33 is coupled to a node Z'.

A transformer T3 has a primary winding L31 and a secondary winding L32. The primary winding L31 has a first end terminal, a first tap, a second tap and a second end terminal. An equal number of turns of the primary winding L31 exists between the first end terminal and the first tap; between the first tap and the second tap; and between the second tap and the second end terminal. The first end terminal of the primary winding L31 is coupled to the node X. The first tap is coupled to the node Y'. The second tap is coupled to the node Z'. The second end terminal of the primary winding L31 is coupled to a drain of an NMOSFET M31. A source of the NMOSFET M31 is coupled to the ground node.

The secondary winding L32 of the transformer T3 has a first terminal and a second terminal. The first terminal of the secondary winding L32 is coupled to an output voltage node VOUT and to a first terminal of a capacitor C3. The second terminal of the secondary winding L32 is coupled to an anode of a diode M32. A second terminal of the capacitor C3 is coupled to the ground node. A cathode of the diode M32 is coupled to the ground node.

A controller circuit U1 in FIG. 3 is the same as the controller circuit U1 shown and described with reference to FIG. 1 and FIG. 2. A first control output terminal OUT1 of the controller U1 is coupled to a gate of the NMOSFET M31 to control a current through the primary winding L31. A voltage input VIN to the controller U1 is coupled to the node X to supply power to the internal circuits of the controller U1. A ground terminal GND of the controller U1 is coupled to the ground node. The diode M32 is for rectifying a current through the secondary winding L22. A feedback terminal VFB of the controller U1 is coupled to the output voltage node VOUT for maintaining the output voltage of the circuit at the desired level.

The first control output terminal OUT1 of the controller U1 is also coupled to a gate of the NMOSFET M34 and coupled to a gate of the NMOSFET M33.

The circuit shown in FIG. 3 operates in much the same way as the circuit shown in FIG. 1. The circuit shown in FIG. 3 differs from the circuit shown in FIG. 1 in that in FIG. 3 the battery cell stack comprises only three battery cells BATT31, BATT32 and BATT33. Another difference is that all the gates of transistors M33 and M34 are coupled to the OUT1 terminal of the controller, rather than any gate being coupled to the drain of M31. However, one or more of M33 and M34 could be a PMOSFET having its gate coupled to the drain of M31, similarly to the circuit of FIG. 1.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiments chosen for illustration without departing from the spirit and scope of the invention.

Specifically, it will be apparent to one of ordinary skill in the art that the device of the present invention could be implemented in several different ways and the apparatus disclosed above is only illustrative of the preferred embodiment of the invention and is in no way a limitation. For example, it would be within the scope of the invention to vary the values of the various components and voltage levels disclosed herein. It will be apparent that transistors of one type, such as NMOS, PMOS and bipolar pnp or npn can be substituted for each other, with switches or other known means for selectively coupling, and in some cases substituted with diodes, with appropriate modifications. Further, by applying the teachings of this disclosure, it will be apparent to a person skilled in the art that a battery converter could be constructed having any number of output voltage nodes by adding additional secondary transformer windings, output capacitors and rectifying elements as needed. In addition, the battery cells disclosed herein may be any type of known battery cells including: NiCad, Alkaline, Halide, Lead-Acid and Lithium battery cells. Also, it will be apparent that the rectifying element could be a diode coupled between the node VOUT and the first terminal of the secondary winding of each transformer disclosed in FIG. 1–3.

What is claimed is:

1. A method of discharging a battery stack wherein the battery stack comprises a plurality of battery cell circuits coupled in series comprising the steps of:
    a. periodically coupling each battery cell circuit of the battery stack across a predetermined number of windings of a primary winding of a transformer for storing energy in the transformer; and
    b. rectifying a current induced in a secondary winding of the transformer for forming an output voltage.

2. The method according to claim 1 wherein each battery cell circuit comprises at least one battery cell selected from a group consisting of NiCad, Alkaline, Halide, Lead-Acid and Lithium battery cells.

3. A battery power converter circuit comprising:
    a. a transformer having a primary winding and a secondary winding wherein the primary winding comprises a plurality of terminals, the plurality of terminals comprising a first primary end terminal, a second primary end terminal and at least one tap terminal wherein a predetermined number of turns of the primary winding are between adjacent ones of the plurality of terminals;
    b. means for selectively coupling each tap terminal to a corresponding battery node, each battery node comprising a positive terminal of one of a plurality of batteries and a negative terminal of one of the plurality of batteries;
    c. means for controlling a first current in the primary winding coupled to the primary winding; and
    d. means for forming a voltage signal from a second current induced in the secondary winding coupled to the secondary winding.

4. The circuit according to claim 3 wherein each tap terminal is selectively coupled to the corresponding battery node during periods wherein the means for controlling has activated the first current.

5. The circuit according to claim 3 wherein the means for selectively coupling comprises a plurality of field effect transistors.

6. The circuit according to claim 3 wherein the voltage signal is formed by rectifying the second current utilizing a rectifying element.

7. The circuit according to claim 3 wherein the rectifying element is selected from the group consisting of a diode, a FET and a bipolar transistor.

8. The circuit according to claim 3 wherein each battery is selected from a group consisting of NiCad, Alkaline, Halide, Lead-Acid and Lithium battery cells.

9. A battery power converter circuit comprising:
    a. a transformer having a primary winding and a secondary winding wherein the primary winding comprises a plurality of terminals, said plurality of terminals comprising a first primary end terminal, a second primary end terminal and at least one tap terminal wherein a predetermined number of turns of the primary winding are between adjacent ones of the plurality of terminals;
    b. a transistor corresponding to each tap terminal, each transistor having a gate, a source and a drain wherein each source is coupled to one tap terminal and each drain comprises an intermediate battery node;

c. a first battery cell circuit having a first positive terminal and a first negative terminal wherein the first positive terminal is coupled to the first primary end terminal and wherein the first negative terminal is coupled to the intermediate battery node which has a least number of primary turns between its corresponding transistor and the first primary end terminal;

d. a last battery cell circuit having a last positive terminal and a last negative terminal wherein the last positive terminal is coupled to the intermediate battery node which has a least number of primary turns between its corresponding transistor and the second primary end terminal and wherein the last negative terminal is coupled to the ground node.

10. The battery power converter circuit according to claim 9 further comprising at least one intermediate battery cell circuit, each intermediate battery cell circuit having an intermediate positive terminal and an intermediate negative terminal wherein each intermediate battery cell circuit is coupled to ones of adjacent pairs of intermediate battery nodes such that each intermediate positive terminal is coupled to the intermediate battery node of the adjacent pair having a least number of primary turns between its corresponding transistor and the second primary end terminal and wherein each intermediate negative terminal is coupled to the intermediate battery node of the adjacent pair having a least number of primary turns between its corresponding transistor and the first primary end terminal.

11. The battery power converter circuit according to claim 10 further comprising means for controlling a current through the primary winding.

12. The battery power converter circuit according to claim 11 wherein each of the transistors is turned on during periods wherein the means for controlling has activated the current through the primary winding.

13. The battery power converter circuit according to claim 12 the current through the primary winding induces a current in the secondary winding.

14. The battery power converter circuit according to claim 13 further comprising means for rectifying the current through the secondary winding for charging an output capacitor wherein the means for rectifying and the output capacitor are coupled to the secondary winding.

15. The battery power converter circuit according to claim 14 wherein the means for rectifying comprises a diode.

16. The battery power converter circuit according to claim 14 wherein the means for rectifying comprises a transistor.

17. The battery power converter circuit according to claim 14 wherein the first battery cell circuit, each intermediate battery cell circuit and the last battery cell circuit each comprise a single battery cell.

18. The battery power converter circuit according to claim 17 wherein the first battery cell circuit, wherein each battery cell is selected from a group consisting of NiCad, Alkaline, Halide, Lead-Acid and Lithium battery cells.

19. The battery power converter circuit according to claim 14 wherein the first battery cell circuit, each intermediate battery cell circuit and the last battery cell circuit each comprise more than one battery cell.

20. The battery power converter circuit according to claim 19 wherein the first battery cell circuit, wherein each battery cell is selected from a group consisting of NiCad, Alkaline, Halide, Lead-Acid and Lithium battery cells.

* * * * *